INVENTORS
Daniel J. Bloomberg
BY Waldon O. Watson
ATTORNEY

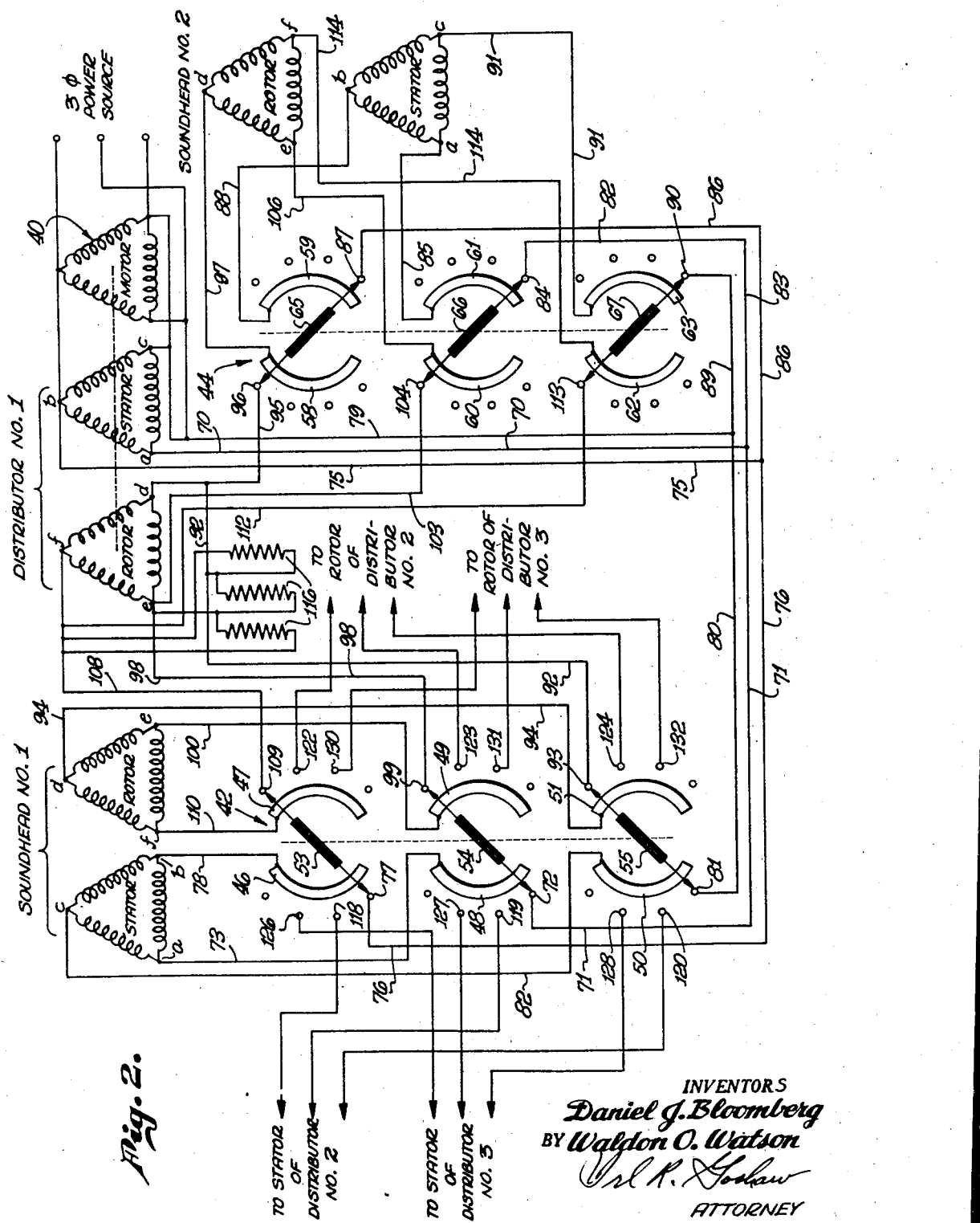

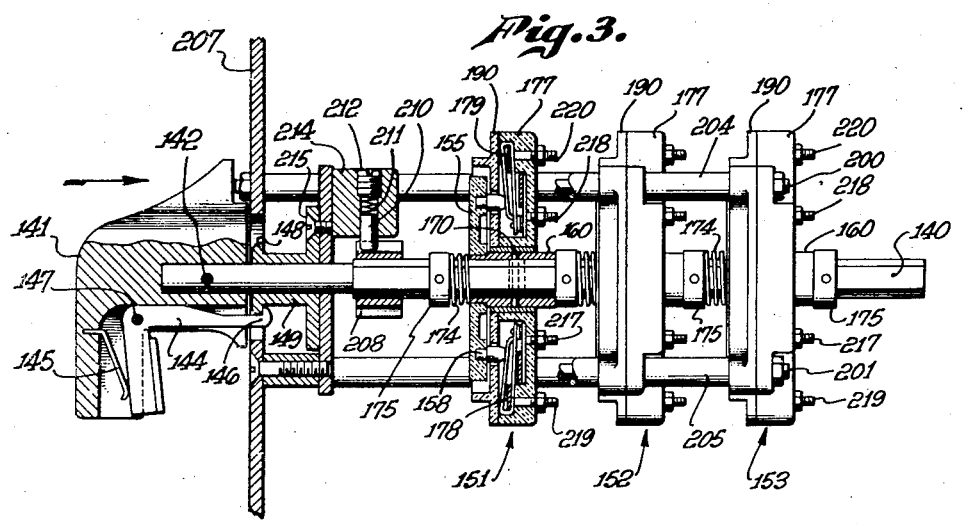

Patented July 27, 1948

2,445,820

UNITED STATES PATENT OFFICE 2,445,820

MOTOR CONTROL SWITCHING SYSTEM AND DEVICE THEREFOR

Daniel J. Bloomberg, Sherman Oaks, and Waldon O. Watson, North Hollywood, Calif., assignors to Radio Corporation of America, a corporation of Delaware Application March 31, 1945, Serial No. 585,914

9 Claims. (Cl. 318—41)

This invention relates to electrical switching systems for plural phase electrical motors, and particularly to an electrical switching system for use with self-synchronizing motors in motion picture sound recording studios wherein different film advancing mechanisms such as sound reproducers, sound recorders, cameras, etc., are interconnected to advance a plurality of films in synchronism.

The use of self-synchronizing motor systems wherein three-phase rotor and stator wound induction motors are employed, are well known, such systems utilizing a distributor-generator and a synchronous driving motor therefor. In these systems, the stators of the synchronous motor, the distributor, and the load motors are all connected to a three-phase alternating current power source, while the rotors of the distributor and load motors are interconnected. As the synchronous driving motor rotates the rotor of the distributor, current flows between the rotors, which causes them to accelerate and rotate in step with one another. Examples of such commercial motor systems are shown in Lootens Patent No. 2,301,910, of November 10, 1942, and Miller Patent No. 2,354,329, of July 25, 1944.

The above-mentioned patents disclose methods of and means for starting a predetermined number of load motors after they have been selected. The present invention is directed to a system for selecting and connecting certain load motors with a selected distributor, which after connection, may be started in the manner shown in these patents.

In motion picture practice, a number of distributors are required because it is necessary to use a distributor for each interconnected system of load motors and several systems may be operated simultaneously. For instance, if it is desired to re-record previously recorded sound tracks using soundheads or film phonographs and a recorder as one system, and at the same time operate a camera and a recorder for making an original sound record as another system, one distributor will be connected to the sound-heads and recorder, and another distributor will be connected to the camera and its recorder. Many times four or five such systems may be operating simultaneously, since in a motion picture studio, many soundheads are employed for rerecording, and it is necessary to employ several recorders to accommodate several cameras when a respective number of companies are shooting scenes. The present invention, therefore, provides a switching system for connecting any selected group of soundheads, recorders, and cameras, to a certain distributor in the event that a particular operation requires that combination.

This general method of operation is not new, but it has been accomplished in the past by the use of large terminal panels together with connecting cords similarly to a telephone switchboard. Such installations required considerable space and the interlacing of cables, which are not particularly convenient to operate. The present invention eliminates all such cables and simplifies the interconnecting of any load motor to a chosen distributor by simply turning a switch to the distributor number and closing the switch. This cannot, of course, be accomplished with the usual type of sliding contact switch, as will be explained hereinafter.

The principal object of the invention, therefore, is to facilitate the selection and interconnecting of the motors of a number of film advancing mechanisms with any one of a plurality of distributors.

Another object of the invention is to provide an improved method of and means for selecting and interconnecting a plurality of motors, distributors, or similar electrical devices.

A further object of the invention is to provide an improved switching device for selecting and interconnecting any number of a plurality of plural phase motors.

A still further object of the invention is to provide an improved multiple three-phase switching device which simultaneously selects and then interconnects all phases of a plurality of motors.

A still further object of the invention is to provide an improved switching operation for rapidly interconnecting a selected plurality of three-phase electrical devices.

A still further object of the invention is to provide an improved selection switch which simultaneously closes a plurality of contacts under the same tension.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 2 is a diagrammatic view of the switching arrangement between two load motors and a distributor showing the connections in detail.

Fig. 3 is a side view partially in cross section of the switch used in the systems of Figs. 1 and 2 in closed position.

Fig. 4 is a partial cross sectional view of the switch shown in Fig. 3 in open position.

Fig. 5 is a plan view of one of the rotary contactor plates taken along the line 5—5 of Fig. 4.

Fig. 6 is a plan view of one of the switch mounting plates taken along the line 6—6 of Fig. 4, and Fig. 7 is an end view of one of the switch cover plates taken along the line 7—7 of Fig. 4.

Figure 1:
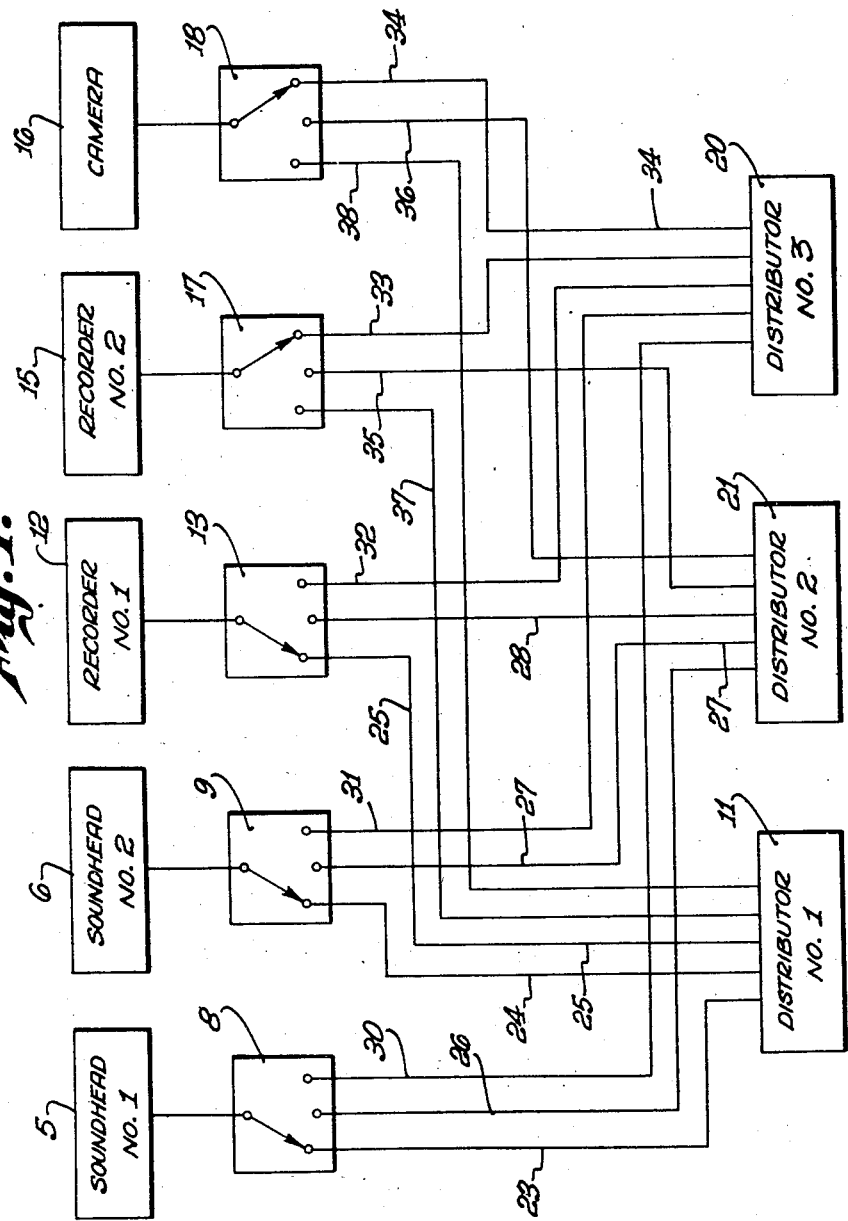
Fig. 1 is a single line diagrammatic view of a switching system embodying the invention.

Referring now to Fig. 1 showing solely a diagrammatic arrangement of the switching problem, two soundheads 5 and 6, two recorders 12 and 15, and one camera 16 are illustrated, each of which has respective switches 8, 9, 13, 17, and 18 and which are shown with three distributors 11, 20, and 21. Only this number of elements have been shown for the sake of clarity, it being understood that any number of devices may be similarly connected, as will be explained hereinafter. As shown in Fig. 1, soundheads 5 and 6, through their switches 8 and 9, are shown connected to distributor 11 along with recorder 12 through switch 13. Recorder 15, together with the camera 16, are connected through respective switches 17 and 18 to distributor 20, the third distributor 21 being idle. The motors used in these units and the distributors are all operated on three-phase, but for clarity, the interconnections are shown by single connectors, while the contacts of the switches are limited to three, since only three distributors are shown.

Referring in detail to the connections, it will be noted that soundhead 5 is connected through switch 8 over conductor 23 to distributor 11, while soundhead 6 is connected over switch 9 and conductor 24 to distributor 11, and recorder 12 is connected over switch 13 and conductor 25 to distributor 11. If it were desired to connect soundheads 5 and 6 and recorder 12 to distributor 21, switches 8, 9, and 13 would be thrown to their center contacts and they would thus be connected over conductors 26, 27, and 28 to distributor 21. Similarly, if the switches 8, 9, and 13 were thrown to their right-hand contacts, soundheads 5, 6, and recorder 12 would be connected to distributor 20 over respective conductors 30, 31, and 32.

On the right-hand side of the drawing, the distributor 20 is shown connected to the recorder 15 and the camera 16 over the right-hand contacts of switches 17 and 18 and conductors 33 and 34. The recorder 15 and the camera 16 could be connected to distributor 21 over conductors 35 and 36, or to distributor 11 over conductors 37 and 38.

Thus, it will be observed that it is possible to connect any one or all of the film advancing units to any one of the distributors. However, such switching units, as illustrated at 8, 9, 13, 17, and 18, would not function satisfactorily if the switch swingers contacted the center contacts in passing back and forth between the outer contacts. For instance, if distributor 21 was already connected and running in an operating system, and it was desired to switch soundhead 5 from distributor 11 to distributor 20, soundhead 5 should not be connected to distributor 21 in the switching operation. Thus, a simple sliding contact switch is not suitable in actual practice. Thus patch cords have been employed in the past for making these connections.

To show in more detail the manner of connecting the three-phase windings of one machine to the three-phase winding of another machine in the proper manner, reference is made to Fig. 2 wherein the motor for soundhead No. 1 is shown with a three-phase stator winding and a three-phase rotor winding, while distributor No. 1 is shown with three-phase rotor and stator windings, the rotor of which is mechanically driven by a three-phase synchronous motor 40. Also illustrated, are the three-phase rotor and stator windings for the motor of soundhead No. 2, which, of course, could also be the motor of a recorder or a camera. Furthermore, Fig. 2 shows two switches 42 and 44 in diagrammatic form to illustrate the manner of interconnecting the multiple phases of the motors of the two soundheads and the distributor, although it is to be understood that such sliding contact switches are not suitable in actual practice as explained above.

Referring first to switch 42, six curved contact bus bars 46, 47, 48, 49, 50, and 51 are shown with four cooperating contacts for each bus bar, the contacts being arranged equidistant from each bus bar. The switch also has three rotating contact arms 53, 54, and 55 all mechanically interconnected, as shown by the dotted line, for simultaneous operation. The ends of the arms are insulated from one another to isolate the two circuits. Similarly, the switch 44 has six crescent bus bars 58, 59, 60, 61, 62, and 63 with respective contacts and three rotatable contact arms 65, 66, and 67. The position of the contact arms of the two switches are such as to interconnect the two soundhead motors and the distributor for operation.

As mentioned above, to operate the units shown in Fig. 2 in synchronism, it is necessary that the stators of the distributor and the stators of the load motors be connected to the three-phase power source, and the rotors of the distributor and load motors be connected together. These connections will now be traced through the switches 42 and 44. From the three-phase power source, power may be impressed on the synchronous motor 40 and simultaneously on the stator of distributor No. 1. Starting from point $a$ on the stator of distributor No. 1, this point is connected over conductor 70 and conductor 71 to a contact 72 of the second section of switch 42. As contact 72 is connected to bar 48 through the left-hand end of arm 54, the connection continues from bar 48 over conductor 73 to point $a$ on the stator of the motor of soundhead No. 1. Now, starting from point $b$ on the stator of distributor No. 1, this point is connected to point $b$ of the motor stator of soundhead No. 1 over conductor 75, conductor 76, contact 77, left-hand end arm 53, bar 46, and conductor 78. Similarly, the point $c$ on the stator winding of distributor No. 1 is connected to point $c$ on the motor stator of soundhead No. 1 over conductor 79, conductor 80, contact 81, left-hand end of contact arm 55, bar 50, and conductor 82.

Since the motor stator winding of soundhead No. 2 must also be connected to the three-phase power source and to the other stators if the two motors are to run in synchronism, a circuit may be traced from point $a$ on the stator of distributor No. 1 over conductor 70, conductor 83, contact 84, right-hand end of arm 66, bar 61, and conductor 85 to point $a$ on the motor stator of the soundhead No. 2. Similarly, from point $b$ of the stator of distributor No. 1, the circuit is over conductor 75, conductor 86, contact 87, right-hand end of arm 65, bar 59, conductor 88, to point $b$ on the motor stator of soundhead No. 2. From point $c$ of distributor No. 1, the circuit is over conductor 79, conductor 89, contact 90, right-hand end of arm 67, bar 63, and conductor 91 to point c on the stator. From the above connections, all three phases of all three stators are interconnected and connected to the three-phase power source.

Similarly, the rotors of the motors of the two soundheads and the distributor are interconnected, the point d on distributor No. 1 being connected over conductor 92, contact 93, right-hand end of arm 55, bar 51, and conductor 94 to the point d on the motor rotor of soundhead No. 1. From this same point d over conductor 95, contact 96, left-hand end of arm 65, bar 58, and conductor 97, a circuit is made to point d on the motor rotor of soundhead No. 2. From the point e on the rotor of the distributor, a circuit may be traced over conductor 98, contact 99, right-hand end of arm 54, bar 49, and conductor 100 to point e on the motor rotor of soundhead No. 1. The circuit from the point e on the distributor to the point e on the motor rotor of soundhead No. 2, is over conductor 103, contact 104, left-hand end of arm 66, bar 60, and conductor 106. The connection for the last phase is traced from point f of the distributor over conductor 108, contact 109, right-hand end of arm 53, bar 47, and conductor 110 to point f on the motor rotor of soundhead No. 1, while the last circuit between the distributor and the motor rotor of soundhead No. 2 is over conductor 112, contact 113, left-hand end of arm 67, bar 62, and conductor 114 to point f.

A plurality of resistors 116 are shown interconnected across the rotor windings to provide the proper starting characteristic.

From the above traced circuits, it is realized that with the rotatable contact arms 53, 54, 55, 65, 66, and 67 rotated to the positions shown in the drawings, the motor rotors of the two soundheads and the rotor of the distributor will be interconnected, and the motor stators of the soundheads and the stator of the distributor will be interconnected and connected to the three-phase power source. Switch 42 may also connect the motor of soundhead No. 1 to any one of three additional distributors simply by rotating the contact arms 53, 54, and 55. For instance, if these arms are rotated one notch to the next contact, the motor stator windings through bars 46, 48, and 50 would be connected to contacts 118, 119, and 120, and thus to the motor stator of distributor No. 2. In this new position of the switch, the motor rotor of soundhead No. 1 would be connected over contacts 122, 123, and 124 to the rotor of distributor No. 2, since these contacts are diametrically opposite to respective contacts 118, 119, and 120. Similarly, by rotating the arms 53, 54, and 55 another notch, the motor stator windings of soundhead No. 1 would be connected to the stator of distributor No. 3 over contacts 126, 127, and 128, while the motor rotor of soundhead No. 1 would be connected to the rotor of distributor No. 3 over contacts 130, 131, and 132. Rotation of the arms 53, 54, and 55 another notch may connect the stator or rotor windings to another distributor. The same arrangement is provided for switch 44 for soundhead No. 2 so that the rotation of the arms 65, 66, and 67 will select any distributor for connection to the soundhead No. 2. It is to be understood that additional contacts may be provided for these switches in case a further number of distributors are to be connected. Also, the connections may be made so that all left-hand switch bars may be for the stators and the right-hand bars for the rotors or vice versa.

With the above described triple-armed switches, such as shown at 42 and 44, for each load unit motor any group of motors may be connected to any particular distributor simply by rotating the contact arms to the contact of the selected distributor. However, if intermediate distributor contacts were in use, it would be necessary to by-pass them in some manner to perform the switching operation. Such a switching device is illustrated in Figs. 3 to 7, inclusive, and will now be described.

The switching device shown in Figs. 3 to 7 operates in two steps. First, the selection of the proper distributor is made by rotation, and second, the actual connections are made by a longitudinal motion of the switch. The switch includes a rotatable octagonal or hexagonal shaft or bar 140 at one end of which is mounted a pistol grip handle 141 by a pin 142. The trigger of the handle is a bell crank 144 pivoted at 147, having a latch tip 146, and urged into locking position by a spring 145. In Fig. 3, the closed position of the switch is shown wherein the tip 146 is in position behind a flange 148 of a collar 149, while in Fig. 4 the switch is shown in open position with the tip 146 removed from the flange 148.

There are three switch sections 151, 152, and 153, each section being identical, so the description of one section is applicable to the other sections. As shown in Fig. 5, each section has a rotatably and longitudinally sliding two element contact plate 155 comprising a disc 156 of insulating material and contact pins 157 and 158, which may be of metal, the pins being diametrically positioned opposite one another on the disc 156. The disc is mounted on a metal sleeve 160, which is pinned by a pin 170 to the shaft 140. The pin 170 is in an elongated slot 172 in the shaft 140 so that the shaft may have a limited movement without moving the plate 155 and the contact pins 157 and 158, as will be explained hereinafter. The disc 156 is urged toward the closed position of the switch by a coil spring 174 positioned between the plate 155 and a collar 175 fixedly mounted on the shaft 140. The remaining portion of each switch section is made up of a dished disc 177 (see Fig. 6) containing two groups of contact switches 178 and 179, each group including five switches, although a different number may be used. These switches are of the micro contact type wherein a contact member 181 is brought into contact with a contact member 182 by a spring element 183 adapted to be moved to the right by the contactor pins 157 and 158. The contact elements 182 of the group 178 are all electrically connected to a crescent bus bar 186, while the contacts of group 179 are all electrically connected to a bus bar 187. These bus bars correspond to bars 46 to 51 and 58 to 63 in Fig. 2. A cover plate 190, as shown in Fig. 7, encloses the switches 178 and 179, except for two groups of holes 191 and 192, these holes being of a size to permit the passage of the pins 157 and 158 and aligned in front of respective switches 178 and 179.

Thus, to close simultaneously any two diametrically opposite switches in the groups 178 and 179, the shaft 140 is rotated by the handle 141 until the pins 157 and 158 are opposite the holes behind which are the switches to be closed, and the handle 141 is then moved to the right. As the shaft 140 is moved longitudinally to the right, the collar 175 bears against the spring 174, which moves the plate 155 to the right and causes the pins 157 and 158 to enter the two diametrically opposite holes 191 and 192 selected. The pins thus move the springs 183 and cause respective contactors 181 to make contact with contactors 182. All three sections 151, 152, and 153 are simultaneously actuated, the springs 174 and slots 172 (see Fig. 3) providing a certain tolerance in the mounting of the switching sections. That is, if a slight difference exists between the spacing of the switch plates 155 or the switches 178 and 179, the differential will be taken up by the springs to permit the collars 175 to move longitudinally without further movement of the disc 156 and to insure a substantially equal pressure of the pins 157 and 158 on the switches. This arrangement also prevents the application of a pressure on the switches which might cause injury and is thus a safety feature. The adjustment is within the limits of the elongated slots 172 in which the plate fastening pins 170 are located. When the switch is unlocked with the trigger 144, the pin 170 insures the removal of the pins from the holes 191 and 192.

As mentioned above, the group switches 178 and 179 each have their own bus bar and the pins 157 and 158 will operate one switch in each group. Thus, since one bus bar is connected to one rotor winding and the other bus bar to a stator winding, each group of switches will function in the same manner as the sliding switches in Fig. 2, but will permit a selection of any distributor without actually making connections with the intermediate terminating contacts of any distributor in use at the time. Furthermore, with the pins 157 and 158 in the holes 191 and 192, the switch is locked against rotation so that it is necessary to disconnect any motor served by the switch before it can be connected to another distributor.

The switch sections 151, 152, and 153 are mounted on four bolts, two of which are shown at 200 and 201 and on which insulating members, two of which are shown at 204 and 205, are placed to maintain the proper separation between the switch sections. The mounting bolts may be used to mount the entire switch on a panel, such as shown at 207. To provide an accurate and definite positioning of the pins 157 and 158 with respect to the holes 191 and 192, a serrated or toothed wheel or pinion 208 is keyed to the shaft 140. Contacting the gear 208 is a resiliently mounted pin 210 urged toward the gear 208 by spring 211 which may be held in position by a set screw 212. The pin, spring, and set screw are mounted in the block casting 214 which is attached to the panel by screws 215. This positive step arrangement insures that the pins 157 and 158 are properly aligned with selected holes 191 and 192 before the contact pins are moved longitudinally.

Electrical connections may be made to the bus bars 186 and 187 at terminals 217 and 218, while each of the contact elements 181 has an individual terminal, such as shown at 219 and 220, the latter corresponding to contacts, such as shown at 81, 109, 120, etc., in Fig. 2. Thus, instead of a terminal rack with sockets, plugs, and patch cords, a panel is provided on which is mounted a selection switch for each load motor. When any load motor is to be connected to any particular distributor, it is only necessary to rotate the handle 141 to the indicated distributor and then push it longitudinally toward the panel to simultaneously make the six connections. During the selecting operation, there is no danger of contacting any live distributor, since signal lights indicating the live distributors are positioned on the switch panels.

The trigger 144 locks the switch in closed position (see Fig. 3). If four or five load motors are to be connected to the same distributor, the respective number of switches will be rotated to that distributor and the connections made in the same manner. It is realized, therefore, that the switching operation and the interconnecting of any specified number of units as a synchronous running system may be very rapidly accomplished. To disconnect a motor, the operator places a finger on the trigger 144 and pulls, the trigger releasing the latch 146 to permit the shaft to be shifted to the left, which allows the spring contactors 181 to break contact with elements 182.

We claim:

1. In a switching system for a plurality of self-synchronous motors, a plurality of load motors and a plurality of distributors adapted to control the acceleration and speed of said load motors, comprising switching means corresponding in number to the number of said load motors and adapted to select and connect any one or more of said load motors to any one of said distributors, each of said switching means comprising a rotatable plate having contact pins thereon, a plurality of fixed normally open contacts, and a rotatable shaft adapted to rotate said plate for making the selection of said fixed contacts and to be moved longitudinally for causing said pins to close the selected contacts to make the connection.

2. A switching system in accordance with claim 1, in which each of said switching means comprises a plurality of sections, each section having one of said rotatable plates and plurality of fixed contacts, and each section being simultaneously actuated and adapted to connect one phase of said load motors to one phase of said distributor.

3. In a switching system for connecting a plurality of three-phase load motors to a selected one of a plurality of three-phase distributors, comprising a switch having a bus bar for each phase of the stator of a load motor and a bus bar for each phase of the rotor of said load motor, fixed contacting elements adapted when actuated to connect the phases of the rotor and stator of a selected distributor to the rotor and stator phases of said motor, a rotatable plate having actuating pins thereon, a fixed plate having apertures through which said pins are adapted to pass to actuate said contacting elements, rotation of said plate selecting any particular contacting elements to be actuated by said pins, and means for moving said plate longitudinally for causing said pins to actuate selected contacting elements.

4. A switching system in accordance with claim 3, in which said rotatable means is adapted to be locked when said contacting elements are actuated.

5. In a switching system for a self-synchronous motor system having a plurality of load motors and a plurality of distributors comprising switching means for each of said load motors, said means including a multi-sectional switch, each section having a pair of bus bars, one bus bar of each section going to a phase of said motor rotor and the other bus bar of each section going to a phase of said motor stator, contacting elements adjacent said bus bars and connected to the phases of different distributors, a rotating element for each section for selecting the distributor contacting elements to which said bus bars are to be connected, and means for simultaneously moving all of said rotating elements longitudinally for simultaneously actuating said selected contacting elements.

6. A switching system in accordance with claim 5, in which said last mentioned means includes means for equalizing the longitudinal movement of said rotating elements.

7. In a switching system for interconnecting selected groups of plural phase motors comprising a switching device for each of said motors, certain terminals of said device being connected to the windings of said motor and certain other terminals being connected to the respective windings of said other motors, a rotatable member for selecting any desired terminals of said other motors, means for preventing connection between said terminals during the selection of said terminals, and means for longitudinally actuating said rotatable member to make contact between said motor terminals and said selected terminals after selection thereof is made.

8. A switching system in accordance with claim 7, in which said switching device has a section for each phase of said motors including a rotatable member for each section, said actuating means rotating and actuating all of said members simultaneously.

9. A switching device comprising a plurality of cup members, a plurality of opposing switch contact elements arranged circularly about the center of said cup members, a shaft extending through the centers of all of said members, said shaft being rotatable and longitudinally movable in said members, and a corresponding plurality of elements mounted on said shaft adjacent said cup members and having projections therefrom adapted to bring opposing contact elements into contact when said shaft is moved longitudinally in one direction, said elements being rotatable with said shaft to select the contact elements to be brought into contact.

DANIEL J. BLOOMBERG.
WALDON O. WATSON.

REFERENCES CITED

The following references are of record in the file of this patent:

UNITED STATES PATENTS

| Number | Name | Date |
|---|---|---|
| 1,110,027 | Aitken | Sept. 8, 1914 |
| 1,583,578 | Crocker | May 4, 1926 |
| 1,889,514 | Cook | Nov. 29, 1932 |
| 2,008,404 | Schaelchlin | July 16, 1935 |
| 2,301,910 | Lootens | Nov. 10, 1942 |
| 2,354,329 | Miller | July 25, 1944 |